United States Patent
Chung et al.

(10) Patent No.: US 9,503,674 B2
(45) Date of Patent: *Nov. 22, 2016

(54) VIDEO RECORDING FAILOVER

(71) Applicant: Verint Systems Inc., Santa Clara, CA (US)

(72) Inventors: Hing Yip Chung, Tseung Kwan O (HK); Fuk Sang Mak, Hong Kong (HK); Golan Levy, Atlanta, GA (US); Wai Chung Lam, Kowloon (HK); Chong Va Cheong, Kowloon (HK); Shiu Hang Tsang, Kowloon (HK)

(73) Assignee: VERINT SYSTEMS INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,189

(22) Filed: Nov. 16, 2015

(65) Prior Publication Data

US 2016/0142666 A1    May 19, 2016

Related U.S. Application Data

(63) Continuation of application No. 14/331,126, filed on Jul. 14, 2014, now Pat. No. 9,204,083, which is a continuation of application No. 13/589,611, filed on Aug. 20, 2012, now Pat. No. 8,781,289, which is a (Continued)

(51) Int. Cl.
| | |
|---|---|
| *H04L 29/06* | (2006.01) |
| *G06F 21/00* | (2013.01) |
| *H04N 5/76* | (2006.01) |
| *H04N 5/765* | (2006.01) |
| *H04N 5/77* | (2006.01) |
| *H04N 21/2747* | (2011.01) |
| *H04N 7/18* | (2006.01) |

(52) U.S. Cl.
CPC ............ *H04N 5/7605* (2013.01); *H04N 5/765* (2013.01); *H04N 5/77* (2013.01); *H04N 7/181* (2013.01); *H04N 7/185* (2013.01); *H04N 21/2747* (2013.01)

(58) Field of Classification Search
CPC .... H04N 5/7605; H04N 7/185; H04N 7/181; H04N 21/2747; H04N 5/765; H04N 5/77
See application file for complete search history.

(56) References Cited

U.S. PATENT DOCUMENTS

| | | | | |
|---|---|---|---|---|
| 4,819,154 A | * | 4/1989 | Stiffler | G06F 11/1435 711/E12.04 |
| 5,283,879 A | * | 2/1994 | Carteau | G06F 11/201 710/1 |

(Continued)

OTHER PUBLICATIONS

"Verint nDVR Pro," Verint Systems Inc. sales brochure, Apr. 2006, 2 pages.

*Primary Examiner* — Lisa Lewis
(74) *Attorney, Agent, or Firm* — Meunier Carlin & Curfman (57) ABSTRACT

Embodiments disclosed herein provide systems and methods for performing video recorder failover. In a particular embodiment, a system for handing a failover of a first Network Video Recorder (NVR) is provided. The system includes a second NVR that receives a video stream and temporarily stores an amount of the video stream to the temporary storage, wherein the amount of the video stream stored in the temporary storage at any given time corresponds to a duration of time sufficient to accommodate a failover of the first NVR to the second NVR. In response to a detection of a failure of the first NVR, the second NVR records the video stream to the second long-term storage and transfers at least a portion of the video stream stored in the temporary storage to the second long-term storage.

18 Claims, 4 Drawing Sheets

Related U.S. Application Data continuation of application No. 12/045,543, filed on Mar. 10, 2008, now Pat. No. 8,294,413.

(60) Provisional application No. 60/952,893, filed on Jul. 31, 2007.

(56) References Cited

U.S. PATENT DOCUMENTS

| | | | |
|---|---|---|---|
| 5,596,708 A * | 1/1997 | Weber | G06F 3/0601 |
| | | | 714/42 |
| 5,671,213 A * | 9/1997 | Kurano | H04L 49/103 |
| | | | 370/218 |
| 6,115,313 A * | 9/2000 | Pio | G11O 5/143 |
| | | | 365/185.33 |
| 7,954,973 B1 * | 6/2011 | Holland | F21S 2/00 |
| | | | 362/146 |
| 2005/0243722 A1 * | 11/2005 | Liu | H04L 12/1868 |
| | | | 370/235 |
| 2006/0109854 A1 * | 5/2006 | Cancel | H04N 5/765 |
| | | | 370/401 |
| 2006/0204229 A1 * | 9/2006 | Onodera | H04N 5/247 |
| | | | 386/223 |

* cited by examiner

VIDEO RECORDING FAILOVER

RELATED APPLICATIONS

This application is a continuation of U.S. patent application Ser. No. 14/331,126 entitled "VIDEO RECORDING FAILOVER," filed on Jul. 14, 2014, which is a continuation of U.S. patent application Ser. No. 13/589,611, entitled "VIDEO RECORDING FAILOVER," filed on Aug. 20, 2012, which is a continuation of U.S. patent application Ser. No. 12/045,543, entitled "VIDEO RECORDING FAILOVER," filed on Mar. 10, 2008, which claims benefit of U.S. Provisional Application Ser. No. 60/952,893, filed Jul. 31, 2007. The disclosures of the above applications are incorporated by reference herein.

TECHNICAL BACKGROUND

Various systems record video for later viewing. For example, video surveillance systems record video produced by surveillance cameras for subsequent analysis. Recorded video may also be used as evidence.

A recorder may receive the video via a packet network using Internet Protocol (IP). The video may be delivered to a video recorder using Real-time Transport Protocol (RTP) packets. Video recorders that receive video in packet form are called Network Video Recorders (NVRs) or Networked Digital Video Recorders (nDVRs).

SUMMARY

Embodiments disclosed herein provide systems and methods for performing video recorder failover. In a particular embodiment, a system for handing a failover of a first Network Video Recorder (NVR) is provided, the first NVR being configured to receive a video stream and to record the video stream to a first long-term storage. The system includes a second NVR having a temporary storage and a second long-term storage. The second NVR being configured to receive the video stream and to temporarily store an amount of the video stream to the temporary storage, wherein the amount of the video stream stored in the temporary storage at any given time corresponds to a duration of time sufficient to accommodate a failover of the first NVR to the second NVR. The second NVR is further configured to in response to a detection of a failure of the first NVR, to record the video stream to the second long-term storage and to transfer at least a portion of the video stream stored in the temporary storage to the second long-term storage. The portion transferred covering at least a time from when the first NVR failed to when the second NVR began recording the video stream to the second long-term storage.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

FIGS. 1-4 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
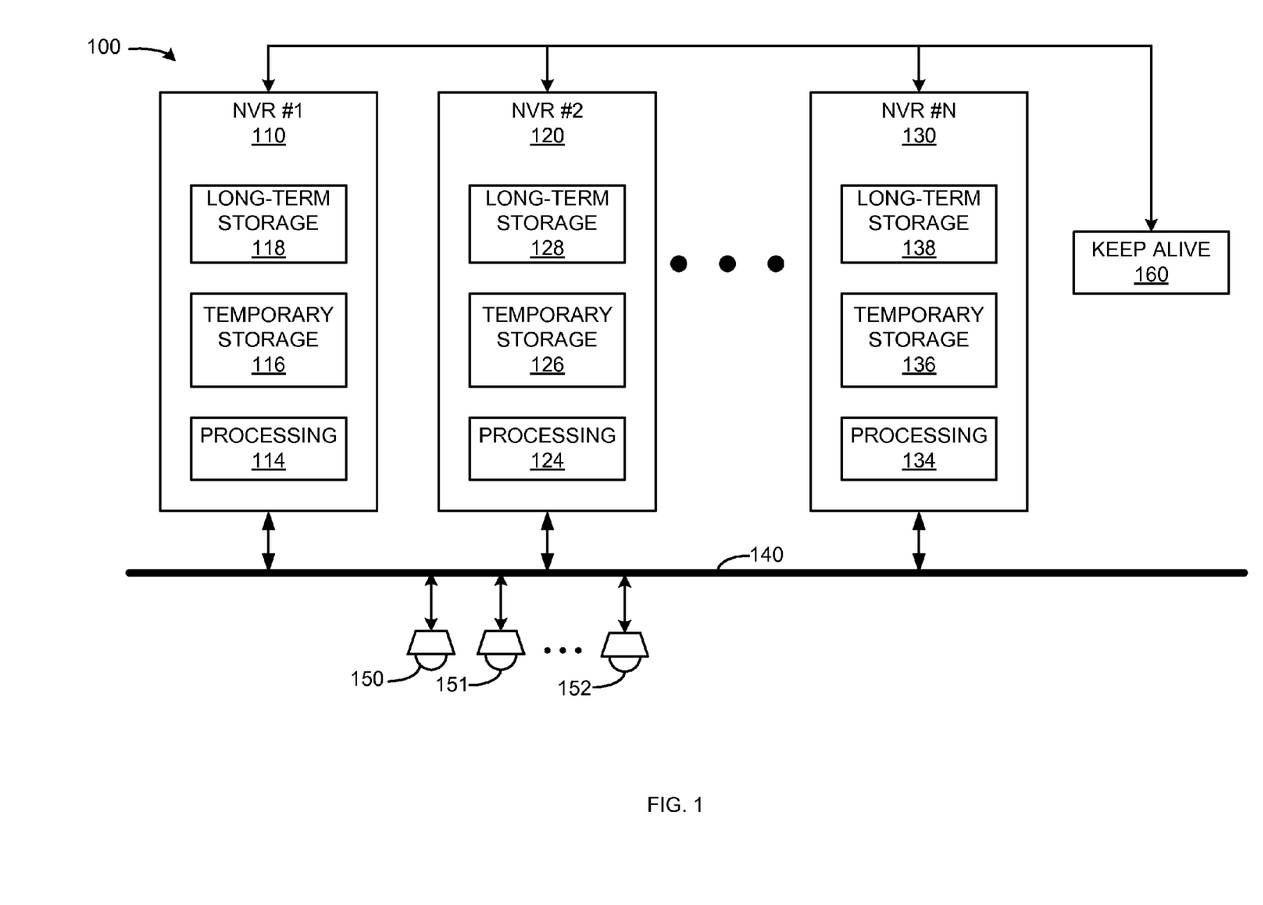
FIG. 1 is a block diagram illustrating a video recording system with failover capability.

FIG. 1 is a block diagram illustrating a video recording system with failover capability. Video recording system 100 comprises: NVR #1 110, NVR #2 120, NVR #N 130, packet network 140, video encoders 150-152, and keep alive box 160. NVR #1 includes processing element 114, temporary storage 116, and long-term storage 118. NVR #2 includes processing element 124, temporary storage 126, and long-term storage 128. NVR #N includes processing element 134, temporary storage 136, and long-term storage 138.

NVRs 110-130 are each operatively coupled to packet network 140. NVRs 110-130 are each operatively coupled to keep alive box 160. Thus, long-term storage 118-138, temporary storage 116-136, and processing 114-134 are all operatively coupled to packet network 140 and keep alive box 160. Video encoders 150-152 are each operatively coupled to packet network 140. Thus, NVRs 110-130 are each operatively coupled to each video encoder 150-152 via packet network 140. Accordingly, each NVR 110-130 may receive and record video being sent by any of video encoders 150-152. Also, each NVR 110-130 may exchange communications with the other NVRs 110-130 via packet network 140.

NVRs 110-130 may be conventional computer systems running network Digital Video Recorder software. In an embodiment, NVRs 110-130 comprise Intel or AMD microprocessor based systems.

Packet network 140 may be an Ethernet Local Area Network (LAN) or a Wide Area Network (WAN) or some other form of computer communications network that sends and receives data in packets. In an embodiment, packet network 140 is a local Ethernet subnet. Thus, all the elements of video recording system 100 are operatively coupled to each other directly via packet network 140. In other words, data packets exchanged between the elements of video recording system 100 do not need to traverse other networks, routers, or gateways.

Video encoders 150-152 capture video images and communicate these images to at least two NVRs 110-130. In an embodiment, video encoders 150-152 may comprise IP cameras. In another embodiment, video encoders 150-152 may capture video from another source such as a closed-circuit TV (CCTV) camera. In an embodiment, video encoders 150-152 are s1708e video encoders available from Verint Systems, Inc.

Video encoders 150-152 communicate video images to NVRs 110-130 using digital data packets. For example, video encoders 150-152 may communicate video images via packet network 140 using Internet Protocol (IP). The video images may be delivered to an NVR using Real-time Transport Protocol (RTP) packets. Video encoders 150-152 may use IP multicast to deliver video images to more than one NVR 110-130 at a time. In another example, video encoders 150-152 may direct the packets containing the video images to multiple NVRs 110-130 using multiple unicast transmissions.

Keep alive box 160 exchanges communication with NVRs 110-130 to monitor the health of each NVR 110-130 and to detect failures. Keep alive box 160 exchanges polling and response messages with each NVR 110-130 via a serial communication link. This serial communication link is separate from, and independent of, packet network 140. This separation allows keep alive box 160 to detect failures even when there is a problem with packet network 140. In an example, the failure of an NVR 110-130 to exchange a polling or response message indicates a failure. In an example, keep alive box 160 and NVRs 110-130 communicate with each other using a RS-232 defined serial communication link.

In normal operation, each NVR 110-130 records a video sent by a video encoder 150-152 in long-term storage 118, 128, and 138, respectively. For example, NVR 110 may record the video sent by video encoder 150 to long-term storage 118. NVR 120 may record the video sent by video encoder 151 to long-term storage 128, and so on.

Before recording to long-term storage, the video may be processed. For example, a date and time stamp may be applied to the video by processing 114, 124, or 134. In another example, the video may be re-encoded or compressed before being recorded in long-term storage 118, 128, or 138.

In normal operation, one or more of NVRs 110-130 stores a portion of the video sent by a video encoder 150-152 in temporary storage 116, 126, and 136, respectively. For example, NVR 110 may temporarily store the last 2 seconds of the video sent by video encoder 151 in temporary storage 116. NVR 120 may temporarily store the last 2 seconds of the video sent by video encoder 152 in temporary storage 126, and so on.

If keep alive box 160 detects a failure of an NVR 110, 120, or 130, it communicates the failure to the master NVR. The master NVR is the one of NVRs 110, 120, or 130 that has been assigned to trigger itself or another NVR to start recording video that was previously being recorded by the failed NVR. In addition, the master NVR triggers the triggered NVR to transfer at least a portion of the temporarily stored video to long-term storage. By transferring temporarily stored video, the triggered NVR records to long-term storage, the portion of video that the failed NVR failed to record because of the failure.

To illustrate, consider a case where: (1) NVR #1 110 is assigned to be the master NVR; (2) NVR #2 120 is recording the video sent by video encoder 151 to long-term storage 128; and, (3) NVR #N 130 is storing the video sent by video encoder 151 in temporary storage 136. When keep alive box 160 detects a failure of NVR #2, keep alive box 160 notifies NVR #1 of the failure. NVR #1 sends a message to NVR #N 130 that triggers NVR #N 130 to start recording the video sent by video encoder 151 to long-term storage 138. This message also triggers NVR #N 130 to transfer at least a portion of the video stored in temporary storage 136 to long-term storage 138. This transfer ensures that video that NVR #2 120 failed to record in long-term storage 124 is recorded in long-term storage 138. The amount of video transferred encompasses the video from a first point in time when NVR #2 failed until a second point in time when NVR #N started recording the video to long-term storage. Accordingly, no video is lost even though there was a failure of NVR #2 120.

The master NVR sends messages to the other NVRs 110-130 that communicate the status of each NVR 110-130 via packet network 140. For example, the master NVR may communicate status that includes, but is not limited to which NVR is recording the video sent by which video encoder or encoders to long-term storage. The master NVR may also communicate status that includes which NVR or NVRs are temporarily storing the video sent by which video encoder or encoders to temporary storage. In general, the master NVR communicates status that allows any NVR 110-130 to take over the duties of the master NVR in the event the master NVR fails.

The master NVR sends periodic messages to the other NVRs 110-130 via packet network 140. These periodic messages communicate that the master NVR is functioning normally. For example, the master NVR may send a periodic message every 200 mS. The absence of a periodic message for more than 600 mS indicates to an NVR 110-130 that the master NVR has failed.

If the master NVR has failed, another NVR 110-130 takes over the duties of the master NVR. For example, if NVR #2 120 has not received a periodic message from the master NVR for more than 600 mS, NVR #2 120 will send a message to the other NVRs 110 and 130 indicating that it is requesting to be the master NVR. NVR #2 will then wait 100 mS to see if another NVR requests to be the master NVR. If no other NVR requests to be the master NVR, then NVR #2 will assume the duties of the master NVR. If more than one NVR requests to be the master, then an assigned identification number determines which NVR will be the master. For example, each NVR 110-130 may be assigned an identification number. The NVR with the lowest assigned identification number among those requesting to be master becomes the master. In another example, the assigned identification number may correspond to a portion of the NVR's IP address. In another example, the assigned identification number may be the last eight bits of the NVR's IP address.

Figure 2:
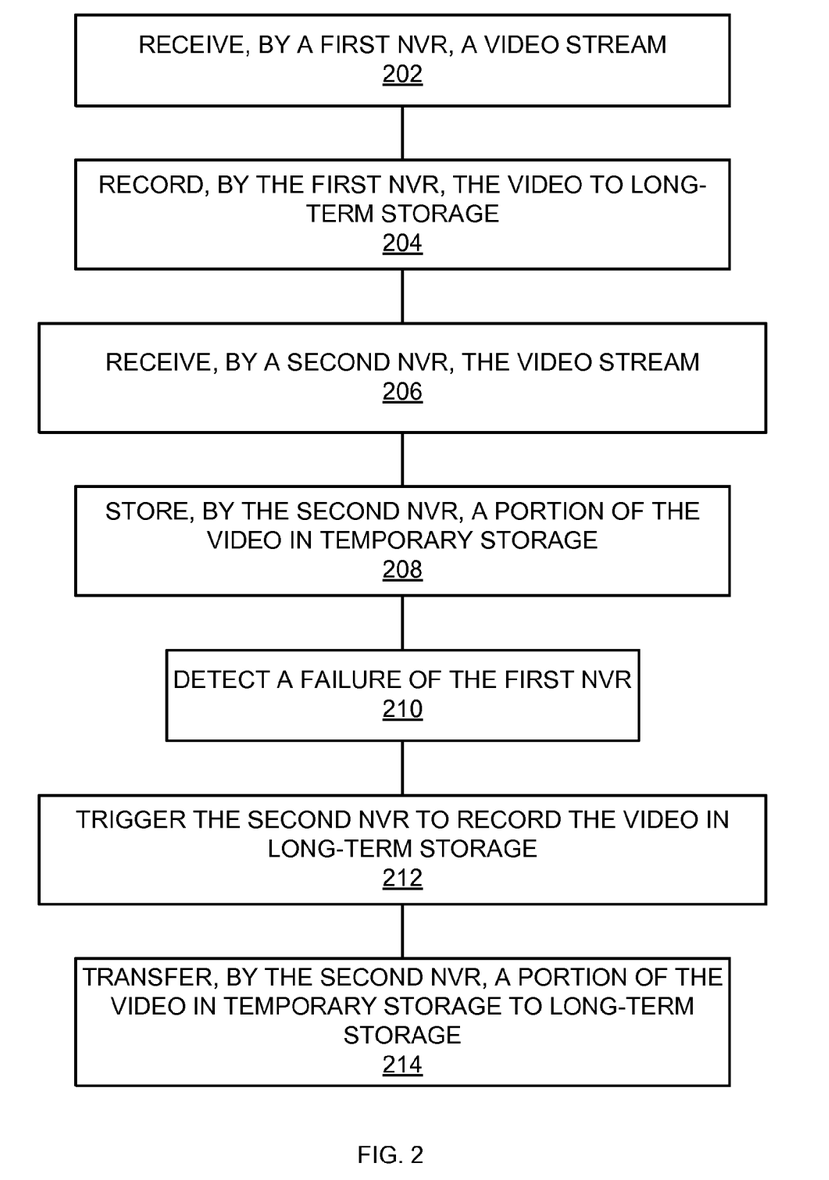
FIG. 2 is a flow diagram illustrating a method for providing NVR failover.

FIG. 2 is a flow diagram illustrating a method for providing NVR failover. This method may be performed by video recording system 100. A first NVR receives a video stream (202). In an example, this video stream may be received from a packet network. In another example, video encoders 150-152 may communicate video images to the first NVR via packet network 140 using Internet Protocol. The video images may be sent to the first NVR using Real-time Transport Protocol (RTP) packets. Video encoders 150-152 may use IP multicast to deliver video images to more than one NVR 110-130 at a time. In another example, video encoders 150-152 may direct the packets containing the video images to multiple NVRs using multiple unicast transmissions.

The first NVR records the video to long-term storage (204). For example, the first NVR may record the video on a hard disk drive. In another example, the first NVR may process the video before recording it in long-term storage. For example, the first NVR may add the current date and time to the video images. In another example, the first NVR may add a watermark to the video images. In another example, the first NVR may re-encode or compress the video. For example, the first NVR may convert the video from an MPEG format, such as MPEG-4 or MPEG-2, to Audio Video Interleave (AVI) format.

A second NVR receives the video stream (206). The second NVR may receive the video stream in a manner similar to how the first NVR received the video stream. Those techniques and examples are discussed above in the discussion of step 202.

The second NVR stores a portion of the video in temporary storage (208). For example, the second NVR may store a portion of the video in volatile memory. In another example, the second NVR may store a portion of the video on an area of a hard disk drive that is designated as temporary storage. In an example, the portion of the video stored in temporary storage is a period of the most recent video received by the second NVR.

The amount of the most recent video received that is stored in temporary storage may be chosen according the requirements of the video recording system. For example, the amount of most recent video received that is stored in temporary storage may be chosen to be equal to or slightly longer than the maximum amount of time it takes to detect a failure of the first NVR and then start the second NVR to recording the video in long-term storage. By choosing at least this amount, no video will be lost in the event of a failure of the first NVR.

A failure of the first NVR is detected (210). For example, this failure may be detected by keep alive box 160. The failure may be detected when the first NVR fails to respond to a polling message sent by keep alive box 160. In another example, the failure may be detected by keep alive box 160 when the first NVR fails to send a polling message to keep alive box 160. In another example, the first NVR may send a message to keep alive box 160 indicating that it has failed.

In response to detecting a failure of the first NVR, the second NVR is triggered to start recording the video in long-term storage (212). For example, keep alive box 160 may inform a master NVR or other computer that the first NVR has failed. In response, the master NVR may send a message to the second NVR instructing it to start recording the video in long-term storage.

The second NVR transfers at least a portion of the video in temporary storage to long-term storage (214). For example, after being instructed to start recording the video in long-term storage, the second NVR may transfer the portion of video in temporary storage that covers at least the time from when the first NVR failed to when the second NVR began recording the video in long-term storage. In this way, no video is lost even though the first NVR failed.

No video is lost because the first NVR will have the video up until it failed in it's long-term storage. The second NVR will have the video from the time it started recording in it's long-term storage. The gap in time between these two events is recorded in long-term storage by the second NVR transferring the portion of video from temporary storage to long-term storage.

Figure 3:
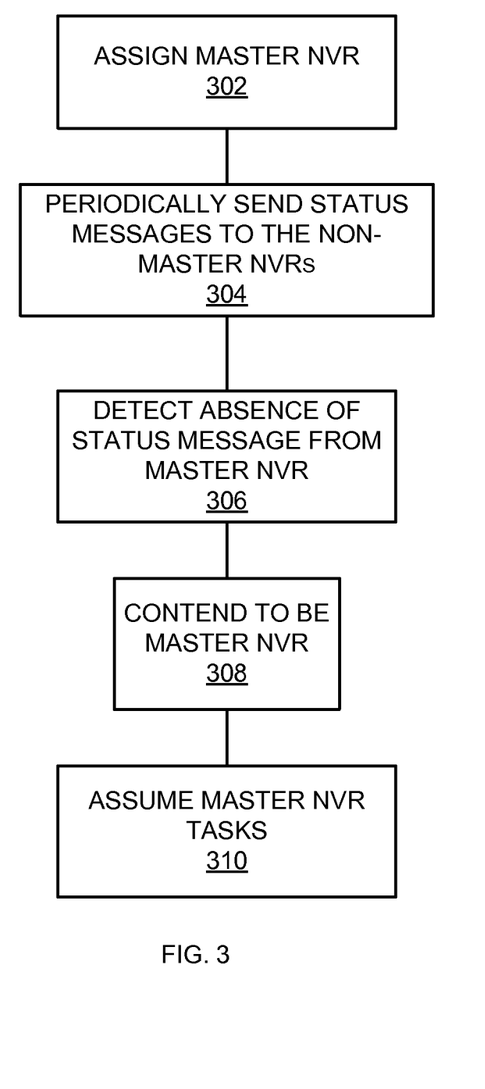
FIG. 3 is a flow diagram illustrating a method for providing master NVR failover.

FIG. 3 is a flow diagram illustrating a method for providing master NVR failover. The steps of this method may be performed by video recording system 100. A master NVR is assigned (302). For example, the master NVR may be assigned by a system administrator or designer. In another example, the master NVR is selected according to an identification number uniquely given to all the NVRs in a group. For example, each NVR on a subnet may be given a unique identification number. The NVR with the lowest identification number is the master. In another example, the identification number may correspond to a portion of the NVR's IP address. In another example, the identification number may be the last eight bits of the NVR's IP address.

The master NVR periodically sends status messages to the non-master NVRs (304). These periodic status messages communicate to the other NVRs that the master NVR is functioning normally. For example, the master NVR may send a periodic status message every 200 mS. The absence of a periodic status message for more than 600 mS indicates to the other NVRs that the master NVR has failed. These periodic status messages may be sent using IP multicast. In another example, the status messages are sent using IP unicast.

The master NVR may also send messages to the other NVRs that communicate information about what each NVR in a group (or on a subnet) is doing. These messages may be part of, or separate from, the periodic status messages. For example, the master NVR may communicate information that includes, but is not limited to, which NVR is recording the video sent by which video encoder or encoders to long-term storage. The master NVR may also communicate information that includes which NVR or NVRs are temporarily storing the video sent by which video encoder or encoders to temporary storage. In general, the master NVR communicates information that allows any of the other NVRs in a group to take over the duties of the master NVR in the event the master NVR fails.

The absence of a status message from the master NVR is detected (306). This absence indicates that the master NVR has failed. For example, the master NVR may send a status message periodically. The absence of one or more of these periodic status message over a set period of time is detected by a receiving NVR. When the receiving NVR detects the absence of one or more of these periodic status messages, it indicates to that NVR that the master NVR has failed. In another example, the master NVR sends a periodic status message every 200 mS. The absence of a periodic status message for more than 600 mS indicates to a non-master NVR that the master NVR has failed.

In response to detecting the absence of status messages from the master NVR, an NVR contends to be the master NVR (308). For example, if an NVR has not received a periodic status message from the master NVR for more than a set period of time, the NVR will send a message to the other NVRs in the group indicating that it is requesting to be the master NVR. The NVR will then wait another set period of time to see if another NVR in the group also requests to be the master NVR. If no other NVR in the group requests to be the master NVR, then the NVR will assume the duties and tasks of the master NVR.

If more than one NVR requests to be the master, then an identification number determines which NVR will be the master. For example, each NVR in a group may be given an identification number. The NVR with the lowest identification number among those requesting to be master becomes the master. In another example, the identification number may correspond to a portion of the NVR's IP address. In another example, the identification number may be the last eight bits of the NVR's IP address.

The NVR winning the contention to become the master NVR assumes the master NVR duties and tasks (310). These duties and tasks include: (1) sending the periodic status messages; (2) communicating the information necessary for another NVR to take over the duties of the master NVR; (3) triggering NVRs to start recording video to long-term storage; and, (4) triggering NVRs to transfer temporarily stored video to long-term storage.

The methods, systems, devices, NVRs, video encoders, keep alive boxes, networks, and subnets, described above may be implemented with, contain, or be executed by one or more computer systems. The methods described above may also be stored on a computer readable medium. Many of the elements of video recording system 100 may be, comprise, or include computers systems. This includes, but is not limited to: NVR #1 110; NVR #2 120; NVR #N 130; packet network 140; video encoders 150-152; keep alive box 160; processing element 114; temporary storage 116; long-term storage 118; processing element 124; temporary storage 126; long-term storage 128; processing element 134; temporary storage 136; and long-term storage 138. These computer systems are illustrated, by way of example, in FIG. 4.

Figure 4:
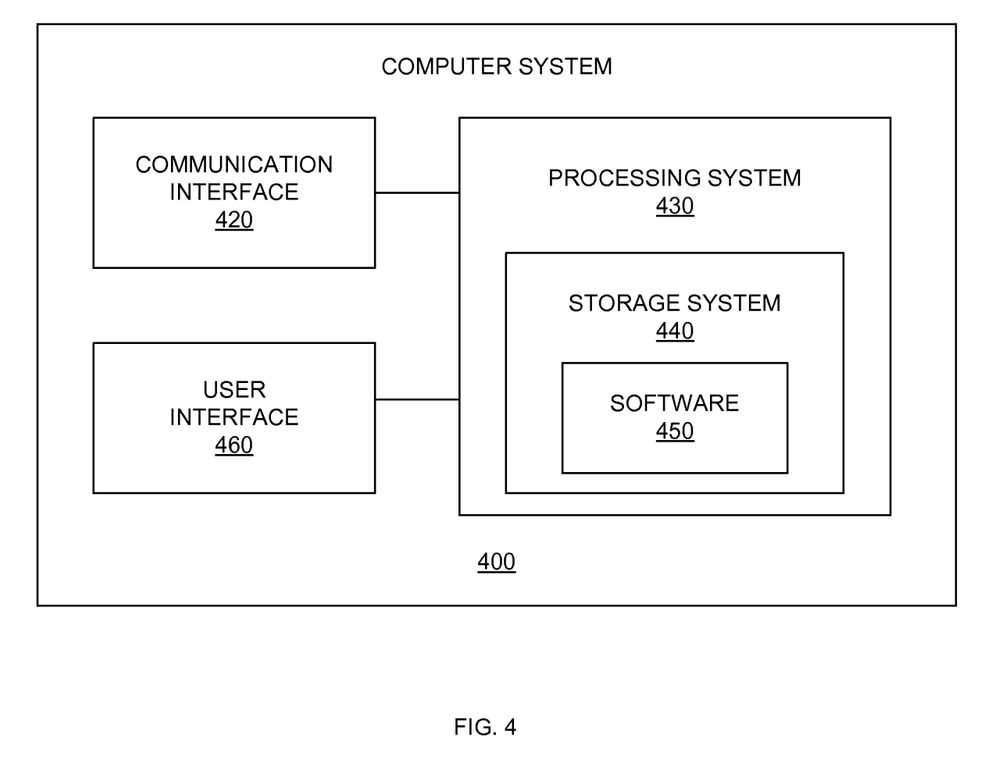
FIG. 4 is a block diagram illustrating a computer system.

FIG. 4 illustrates a block diagram of a computer system. Computer system 400 includes communication interface 420, processing system 430, and user interface 460. Processing system 430 includes storage system 440. Storage system 440 stores software 450. Processing system 430 is linked to communication interface 420 and user interface 460. Computer system 400 could be comprised of a programmed general-purpose computer, although those skilled in the art will appreciate that programmable or special purpose circuitry and equipment may be used. Computer system 400 may be distributed among multiple devices that together comprise elements 420-460.

Communication interface 420 could comprise a network interface, modem, port, transceiver, or some other communication device. Communication interface 420 may be distributed among multiple communication devices. Processing system 430 could comprise a computer microprocessor, logic circuit, or some other processing device. Processing system 430 may be distributed among multiple processing devices. User interface 460 could comprise a keyboard, mouse, voice recognition interface, microphone and speakers, graphical display, touch screen, or some other type of user device. User interface 460 may be distributed among multiple user devices. Storage system 440 could comprise a disk, tape, integrated circuit, server, or some other memory device. Storage system 440 may be distributed among multiple memory devices. Storage system 440 may include temporary, short-term, and long-term storage.

Processing system 430 retrieves and executes software 450 from storage system 440. Software 450 may comprise an operating system, utilities, drivers, networking software, and other software typically loaded onto a computer system. Software 450 could comprise an application program, firmware, or some other form of machine-readable processing instructions. When executed by processing system 430, software 450 directs processing system 430 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A video recording system for handling a failover of a first Network Video Recorder (NVR), the first NVR being configured to receive a video stream and to record the video stream to a first long-term storage, the system comprising:
    a second Network Video Recorder (NVR) having a temporary storage and a second long-term storage, the second NVR configured to:
    receive the video stream and temporarily store an amount of the video stream to the temporary storage, wherein the amount of the video stream stored in the temporary storage at any given time corresponds to a duration of time sufficient to accommodate a failover of the first NVR to the second NVR; and
    in response to a detection of a failure of the first NVR, record the video stream to the second long-term storage, and transfer at least a portion of the video stream stored in the temporary storage to the second long-term storage, wherein the portion transferred covers at least a time from when the first NVR failed to when the second NVR began recording the video stream to the second long-term storage.

2. The video recording system of claim 1, further comprising:
    a keep alive box configured to detect the failure of the first NVR and responsively indicate for the second NVR to operate as a failover NVR for the first NVR.

3. The video recording system of claim 2, further comprising:
    a third NVR that receives a message from the keep alive box indicating that the failure of the first NVR has occurred; and
    wherein the third NVR triggers the second NVR to start recording the video stream.

4. The video recording system of claim 3, wherein the second NVR receives a second video stream and stores the second video stream in the temporary storage.

5. The video recording system of claim 3, wherein the third NVR triggered the second NVR to start recording the video based upon an assigned identification number.

6. The video recording system of claim 2, further comprising:
    a third NVR configured to receive a second video stream, record the second video stream to a third long-term storage, receive a message from the keep alive box indicating that the failure of the first NVR has occurred, and trigger the second NVR to start recording the video;
    a fourth NVR configured to receive a message from the keep alive box indicating that a failure of the third NVR has occurred and trigger a fifth NVR to start recording the second video stream to a fourth long-term storage.

7. The video recording system of claim 6, wherein the third NVR periodically sends a message to the fourth NVR and the absence of the message triggers the fourth NVR to assume responsibility for triggering the fifth NVR to start recording a third video.

8. The video recording system of claim 1, wherein the first NVR and the second NVR receive the video stream via packets addressed to an IP multicast group address.

9. A method for handling a failover of a first Network Video Recorder (NVR), the first NVR being configured to receive a video stream and to record the video stream to a first long-term storage, the method comprising:
    receiving the video stream by a second NVR having a temporary storage and a second long-term storage;
    temporarily storing, by the second NVR, an amount of the video stream to the temporary storage, wherein the amount of the video stream stored in the temporary storage at any given time corresponds to a duration of time sufficient to accommodate a failover of the first NVR to the second NVR;

detecting a failure of the first NVR;

in response to the failure of the first NVR, recording, by the second NVR, the video stream to the second long-term storage and transferring at least a portion of the video stream stored in the temporary storage to the second long-term storage, wherein the portion transferred covers at least a time from when the first NVR failed to when the second NVR began recording the video stream to the second long-term storage.

10. The method of claim 9, wherein a third NVR triggers the second NVR to start recording the video.

11. The method of claim 10, further comprising:

assigning the third NVR to trigger the second NVR to start recording in the event of the failure of the first NVR;

in response to a failure of the third NVR, assigning a fourth NVR to trigger the second NVR to start recording in the event of the failure of the first NVR.

12. The method of claim 9, further comprising:

receiving, by the second NVR, a second video stream;

temporarily storing, by the second NVR, the second video stream in temporary storage.

13. The method of claim 9, further comprising choosing to trigger the second NVR to start recording the video based on an assigned identification number.

14. A non-transitory computer readable medium having instructions stored thereon, that when executed, direct a video recording system to execute a process for handling a failover of a first Network Video Recorder (NVR), the first NVR being configured to receive a video stream and to record the video stream to a first long-term storage, the process comprising the steps of:

receiving the video stream, by a second NVR having a temporary storage and a second long-term storage, the video stream;

temporarily storing, by the second NVR, an amount of the video stream into the temporary storage, wherein the amount of the video stream stored in the temporary storage at any given time corresponds to a duration of time sufficient to accommodate a failover of the first NVR to the second NVR;

detecting a failure of the first NVR;

in response to the failure of the first NVR, recording, by the second NVR, the video stream to a the second long-term storage and transferring at least a portion of the video stream stored in the temporary storage to the second long-term storage, wherein the portion transferred covers at least a time from when the first NVR failed to corresponding to the amount of time between detection of the failure and when the second NVR began recording the video stream to the second long-term storage.

15. The non-transitory computer readable medium of claim 14, wherein a third NVR triggers the second NVR to start recording the video.

16. The non-transitory computer readable medium of claim 14, wherein the process further comprises:

receiving, by the second NVR, a second video stream;

temporarily storing, by the second NVR, the second video stream in temporary storage.

17. The non-transitory computer readable medium of claim 14, wherein the process further comprises choosing to trigger the second NVR to start recording the video based on an assigned identification number.

18. The non-transitory computer readable medium of claim 17, wherein the process further comprises:

assigning the third NVR to trigger the second NVR to start recording in the event of the failure of the first NVR; and in response to a failure of the third NVR, assigning a fourth NVR to trigger the second NVR to start recording in the event of the failure of the first NVR.

* * * * *